US008520924B2

(12) United States Patent
Liao et al.

(10) Patent No.: US 8,520,924 B2
(45) Date of Patent: Aug. 27, 2013

(54) SPATIO-TEMPORAL ANALYSIS FOR AUTOMATIC CONTRAST INJECTION DETECTION ON ANGIOGRAPHY DURING TRANS-CATHETER AORTIC VALVE IMPLANTATION (75) Inventors: Rui Liao, Princeton Junction, NJ (US); Michelle Xiaohong Yan, Princeton, NJ (US); Wei You, Vancouver (CA)

(73) Assignee: Siemens Corporation, Iselin, NJ (US)

( * ) Notice: Subject to any disclaimer, the term of this patent is extended or adjusted under 35 U.S.C. 154(b) by 147 days.

(21) Appl. No.: 13/283,793

(22) Filed: Oct. 28, 2011

(65) Prior Publication Data

US 2012/0134553 A1  May 31, 2012

Related U.S. Application Data (60) Provisional application No. 61/409,641, filed on Nov. 3, 2010.

(51) Int. Cl.
G06K 9/00 (2006.01)
A61B 5/02 (2006.01)
(52) U.S. Cl.
USPC ............................ 382/128; 382/224; 600/508
(58) Field of Classification Search
USPC ................ 382/100, 103, 128–134, 162, 168, 382/173, 181, 190, 224, 232, 254, 274, 276, 382/305, 154; 623/3.1; 607/105; 514/259.3; 378/4, 21; 600/508
See application file for complete search history.

(56) References Cited

U.S. PATENT DOCUMENTS

| | | | |
|---|---|---|---|
| 6,191,136 B1 * | 2/2001 | Marban | 514/259.3 |
| 6,676,688 B2 * | 1/2004 | Dobak et al. | 607/105 |
| 7,311,731 B2 * | 12/2007 | Lesniak et al. | 623/3.1 |
| 8,290,228 B2 * | 10/2012 | Cohen et al. | 382/128 |

OTHER PUBLICATIONS

R.Liao et al., "Automatic Detection of Contrast Injection on Fluoroscopy and Angiography for Image guided Trans-Catheter Aortic Valve Implantations (TAVI)", SPIE 2011.*
A.Pichard et al., "Motion Percutaneous Aortic Valve Replacement", Cardiac Interventions Today, 2008.
M.John et al., "System to Guide Transcatheter Aortic Valve Implantations Based on Interventional C-Arm CT Imaging", MICCAI, 2010.
A.Condurache et al., "Fast Detection and Processing of Arbitrary Contrast Agent Injections in Coronary Angiography and Fluoroscopy", SPIE 2005.
Chih-Chung Chang and Chih-Jen Lin, "LIBSVM: a library for support vector machines", 2001.
S.Shpilfoygel, et al., "X-ray videodensitometric methods for blood flow and velocity measurement: A critical review of literature", Medical Physics, 27(9): 2008-2023, 2000.

(Continued)

*Primary Examiner* — Seyed Azarian
(74) *Attorney, Agent, or Firm* — Donald B. Paschburg; F. Chau & Associates, LLC (57) ABSTRACT A method that includes generating a contrast feature curve for a medical image sequence including a plurality of frames, where the contrast feature curve represents contrast feature values of the frames. The method further includes detecting a peak in the contrast feature curve, and determining whether the peak corresponds to at least one of contrast injection in an aortic root, contrast injection in a balloon, and a non-contrast injected region.

17 Claims, 11 Drawing Sheets

(56) References Cited

OTHER PUBLICATIONS

J.Mutch et al., "Object Class Recognition and Localization Using Sparse Features with Limited Receptive Fields", Int. J. Comput Vis. 80: 45-57, 2008.

A.Tsai et al., "A Shape-based Approach to the Segmentation of Medical Imagery Using Level Sets", IEEE Trans. On Medical Imaging, vol. 22, No. 2, Feb. 2003.

* cited by examiner (a)

SPATIO-TEMPORAL ANALYSIS FOR AUTOMATIC CONTRAST INJECTION DETECTION ON ANGIOGRAPHY DURING TRANS-CATHETER AORTIC VALVE IMPLANTATION

CROSS-REFERENCE TO RELATED APPLICATIONS

This application claims priority under 35 U.S.C. §119 to U.S. provisional application No. 61/409,641, filed Nov. 3, 2010, the disclosure of which is incorporated by reference herein in its entirety.

This application is related to commonly assigned U.S. non-provisional application entitled "AUTOMATIC DETECTION OF CONTRAST INJECTION," Ser. No. 13/211,716, which claims priority under 35 U.S.C. §119 to U.S. provisional application No. 61/385,594, filed Sep. 23, 2010, each of which is incorporated by reference herein in its entirety.

BACKGROUND OF THE INVENTION

1. Technical Field

The present invention relates to a method for automatically detecting whether there is contrast injection in the aortic root on a fluoroscopy or angiography sequence.

2. Discussion of the Related Art

Figure 1:
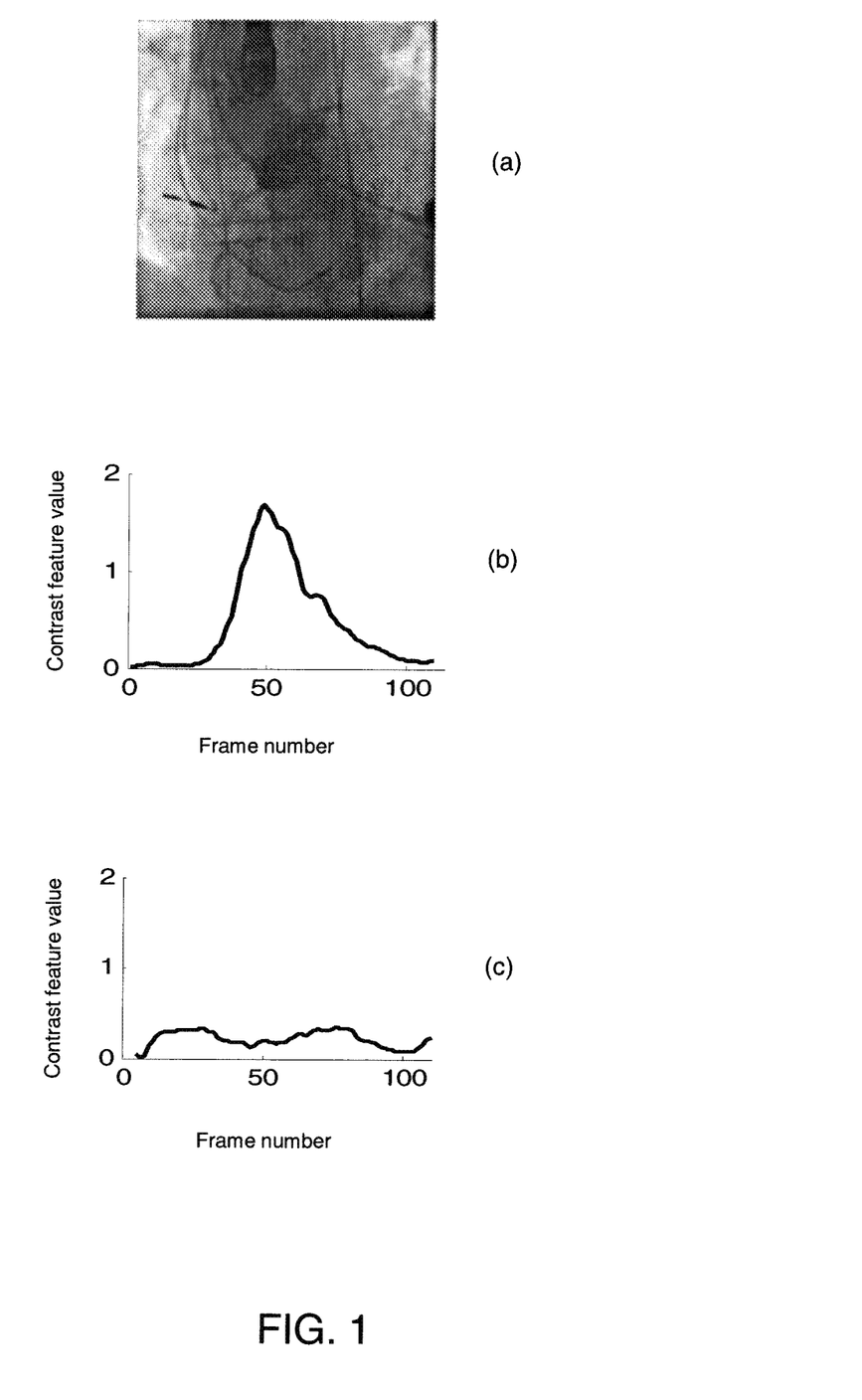
FIG. 1 illustrates fluoroscopic images with contrast (a), and contrast feature curves for sequences with (b) and without contrast agent injection (c), the contrast feature curves being computed according to an exemplary embodiment of the present invention.

Aortic valve disease leads to 60,000 surgical aortic valve replacements every year in Europe and even more in the United States. Trans-catheter aortic valve implantation (TAVI) is a minimal invasive surgery, with recent advances in utilizing three-dimensional (3D) models to provide anatomical details and more accurate C-arm angulation. Accurate overlay of 3D models onto fluoroscopy can be achieved by matching a 3D model to the angiography with contrast injection showing the aortic root, as shown in FIG. 1a. Automatic detection of the contrast injection into the aortic root can subsequently trigger two-dimensional (2D)/3D registration automatically during TAVI procedures to compensate for motions such as patient movement and aortic root movement due to the insertion of devices. A seamless workflow for motion compensation is important for TAVI, which is a relatively complicated hybrid-OR application involving a large number of staff, equipment and steps.

A few papers have addressed a workflow for motion compensation in TAVI. For example, in A. Condurache et al., "Fast Detection and Processing of Arbitrary Contrast Agent Injections in Coronary Angiography and Fluoroscopy," SPIE, 2005, 98 percentile of the vessel map histogram is used as the feature for contrast detection. This simple feature, however, is not normalized and its value can change significantly across different sequences and/or patients, making the subsequent classification task difficult. A likelihood ratio test-based method for contrast detection was proposed in R. Liao et al., "Automatic Detection of Contrast Injection on Fluoroscopy and Angiography for Image guided Trans-Catheter Aortic Valve Implantations (TAVI)," SPIE, 2011. Here, temporal analysis of a contrast feature curve can reliably detect a single contrasted frame for each contrast injection across different patients.

SUMMARY OF THE INVENTION

In this disclosure, the method in R. Liao et al., "Automatic Detection of Contrast Injection on Fluoroscopy and Angiography for Image guided Trans-Catheter Aortic Valve Implantations (TAVI)," SPIE, 2011, the disclosure of which is incorporated by reference herein in its entirety, is extended to further handle difficult cases, including faint contrast that often leads to a false negative, and a contrasted balloon that often leads to a false positive. In addition, for sequences with a good volume of contrast injection, as indicated by a high peak on the contrast feature curve, the range of frames that contain a decently contrasted aortic root is further detected. This information can be used to automatically register a three-dimensional (3D) model to a sequence of contrasted frames for cardiac motion model construction, and/or to turn off motion compensation by tracking devices such as the pigtail catheter, which may be unreliable when the contrast agent is present.

In an exemplary embodiment of the present invention, a method comprises: generating a contrast feature curve for a medical image sequence comprising a plurality of frames, wherein the contrast feature curve represents contrast feature values of the frames; detecting a peak in the contrast feature curve; and determining whether the peak corresponds to at least one of contrast injection in an aortic root, contrast injection in a balloon, and a non-contrast injected region.

The medical image sequence is fluoroscopic or angiographic.

A contrast feature value of a frame is a ratio of histogram similarity at that frame to a first reference histogram representing the aortic root with contrast injection and a second reference histogram representing the aortic root without contrast injection.

Figure 4:
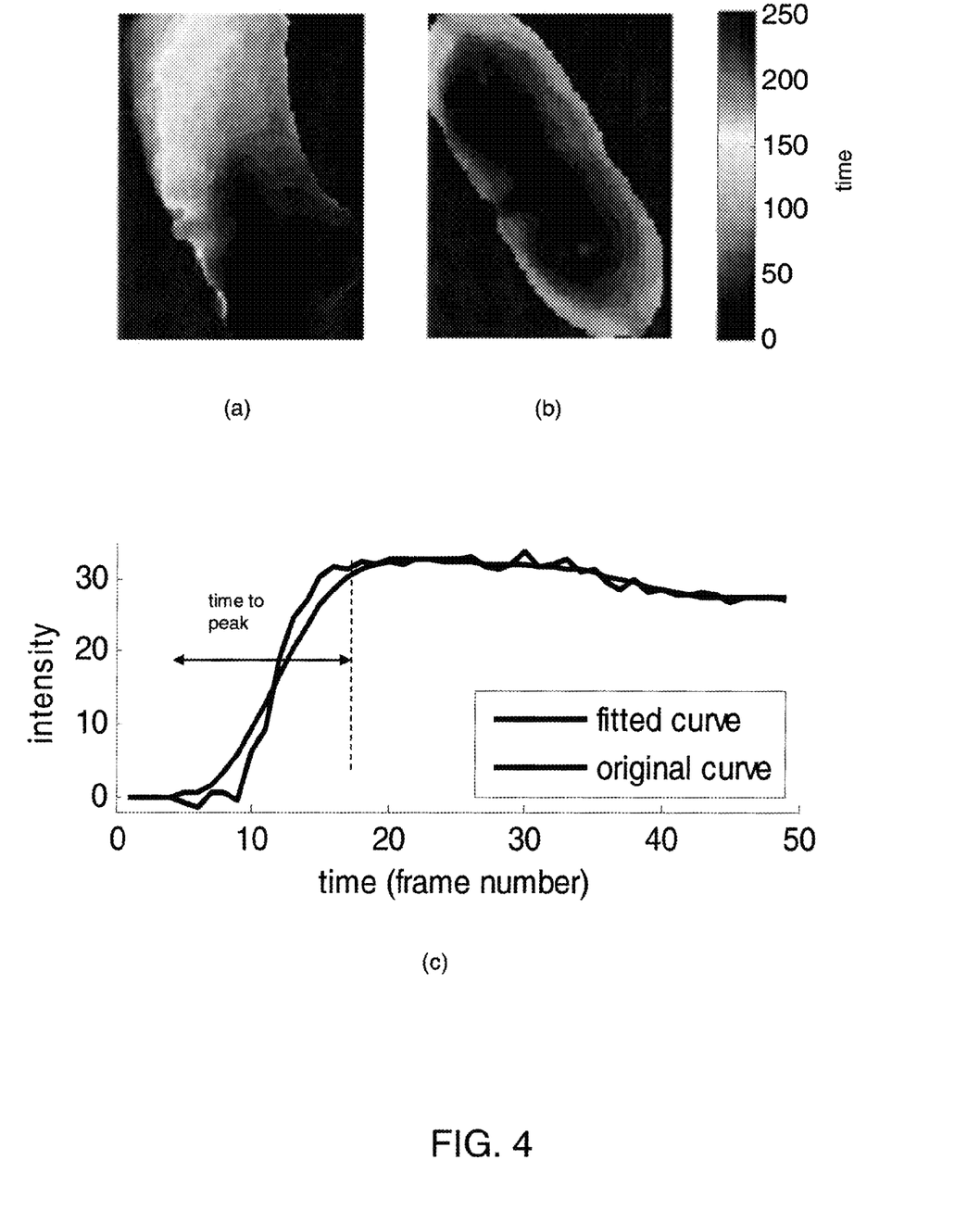
FIG. 4 illustrates a spatio-temporal feature map of an aorta (a) and a balloon (b), and the time-to-peak calculation for an example pixel (c), the spatio-temporal feature maps and time-to-peak calculation being computed according to an exemplary embodiment of the present invention.

When the contrast feature values of the peak are greater than a first threshold, the method further comprises: generating a spatio-temporal feature map which identifies an arrival time of contrast injection at each pixel; identifying, in the spatio-temporal feature map, a distribution pattern of the time-of-arrival; and determining that the spatio-temporal feature map is of the aortic root if the time-of-arrival is smallest near a lower edge of the spatio-temporal feature map and increases upward (as shown in FIG. 4a), or that the spatio-temporal feature map is of the balloon if the time-of-arrival is smallest near a center of the spatio-temporal feature map and increases outward (as shown in FIG. 4b).

A shape similarity score is calculated using shape matching to a segmentation of the spatio-temporal feature map to further determine that the sequence is of the aortic root or the balloon.

A cascaded classifier is used to combine the distribution pattern of the time-of-arrival and a shape-similarity score to detect a balloon.

The method further comprises determining which frames neighboring the frames of the peak have contrast injection, wherein this determination is performed using a classifier trained using the frames of the peak known to have contrast injection and frames not neighboring the peak known not to have contrast injection.

When the contrast feature values of the peak are less than a first threshold and greater than a second threshold, the method further comprises: extracting features from the medical image sequence and feeding the features into a support vector machine (SVM) to train the SVM; and classifying frames in the neighborhood of the peak as being of the contrast injected aorta or not having contrast injection based on the number of neighboring frames classified as contrasted using the SVM.

When the contrast feature values of the peak are less than a second threshold the peak corresponds to the non-contrast injected region.

In an exemplary embodiment of the present invention, a system comprises: a memory device for storing a program; a processor in communication with the memory device, the processor operative with the program to: generate a contrast feature curve for a medical image sequence comprising a plurality of frames, wherein the contrast feature curve represents contrast feature values of the frames; detect a peak in the contrast feature curve; and determine whether the peak corresponds to at least one of contrast injection in an aortic root, contrast injection in a balloon, and a non-contrast injected region.

The medical image sequence is fluoroscopic or angiographic.

A contrast feature value of a frame is a ratio of histogram similarity at that frame to a first reference histogram representing the aortic root with contrast injection and a second reference histogram representing the aortic root without contrast injection.

When the contrast feature values of the peak are greater than a first threshold, the processor is operative with the program to: generate a spatio-temporal feature map which identifies an arrival time of contrast injection at each pixel; identify, in the spatio-temporal feature map, a distribution pattern of the time-of-arrival; and determine that the spatio-temporal feature map is of the aortic root if the time-of-arrival is smallest near a lower edge of the spatio-temporal feature map and increases upward, or that the spatio-temporal feature map is of the balloon if the time-of-arrival is smallest near a center of the spatio-temporal feature map and increases outward.

A shape similarity score is calculated using shape matching to a segmentation of the spatio-temporal feature map to further determine that the medical image sequence is of the aortic root or the balloon.

A cascaded classifier is used to combine the distribution pattern of the time-of-arrival and a shape-similarity score to detect a balloon.

The processor is operative with the program to determine which frames neighboring the frames of the peak have contrast injection, wherein this determination is performed using a classifier trained using the frames of the peak known to have contrast injection and frames not neighboring the peak known not to have contrast injection.

When the contrast feature values of the peak are less than a first threshold and greater than a second threshold, the processor is operative with the program to: extract features from the medical image sequence and feed the features into an SVM to train the SVM; and classify frames in the neighborhood of the peak as being of the contrast injected aorta or not having contrast injection based on the number of neighboring frames classified as contrasted using the SVM.

When the contrast feature values of the peak are less than a second threshold the peak corresponds to the non-contrast injected region.

In an exemplary embodiment of the present invention, a computer program product, comprises: a non-transitory computer readable storage medium having computer readable program code embodied therewith, the computer readable program code comprising: computer readable program code configured to perform the steps of: generating a contrast feature curve for a medical image sequence comprising a plurality of frames, wherein the contrast feature curve represents contrast feature values of the frames; detecting a peak in the contrast feature curve; and determining whether the peak corresponds to at least one of contrast injection in an aortic root, contrast injection in a balloon, and a non-contrast injected region.

DETAILED DESCRIPTION OF EXEMPLARY EMBODIMENTS

Disclosed herein, in accordance with an exemplary embodiment of the present invention, is a method for detecting contrast agent injection in fluoroscopic and/or angiographic sequences by an integrated temporal and spatial analysis. This method aims at solving difficult cases that are associated with the contrast feature curve developed in R. Liao et al., "Automatic Detection of Contrast Injection on Fluoroscopy and Angiography for Image guided Trans-Catheter Aortic Valve Implantations (TAVI)," SPIE, 2011. Briefly, in the method disclosed herein, a cascaded classifier removes contrasted balloons from a contrasted aorta by combining a spatio-temporal feature with shape features. A local classifier is trained using temporal information provided by the contrast feature curve to identify a range of contrasted frames. Further, for sequences with faint contrast, frames with a high contrast feature value may be tested with a classifier and features may be selected therefrom using a recognition method.

In total, the method disclosed herein was tested on 69 sequences. Among them 36 sequences contained well-contrasted aorta; 17 contained an expanding balloon; 4 contained faint contrast; 4 were difficult non-contrasted cases; and 8 were typical non-contrasted sequences. The method correctly classified all of the sequences except for one balloon case, demonstrating its robustness and high accuracy. The method will now be described in detail.

For a given sequence of fluoroscopy or angiography with N frames, the goal is to detect whether there is contrast injection in the aortic root in one or more frames of the sequence. The method is based on a temporal curve of the contrast feature developed in R. Liao et al., "Automatic Detection of Contrast Injection on Fluoroscopy and Angiography for Image guided Trans-Catheter Aortic Valve Implantations (TAVI)," SPIE, 2011. For each frame j, a contrast feature $cf_j$ as a ratio of histogram similarity to the reference histograms with and without contrast injection, is introduced. A pre-defined aorta shape model SM is imposed via image-based two-dimensional (2D)/2D registration to constrain the region for histogram calculation. In general, the temporal curve of $cf_j$, denoted as contrast feature curve in this disclosure, contains a dominant peak for a sequence with contrast injection as seen in FIG. 1b. However, it is relatively flat as shown in FIG. 1c for a sequence without contrast. This contrast feature has many robust properties, for example, it is insensitive to the change of the absolute value in image intensity, the size of the aorta, and the volume and density of the injected contrast. These properties make the contrast feature curve useful to identify frames with contrast injection in a fluoroscopic and/or angiographic sequence.

Figure 2:
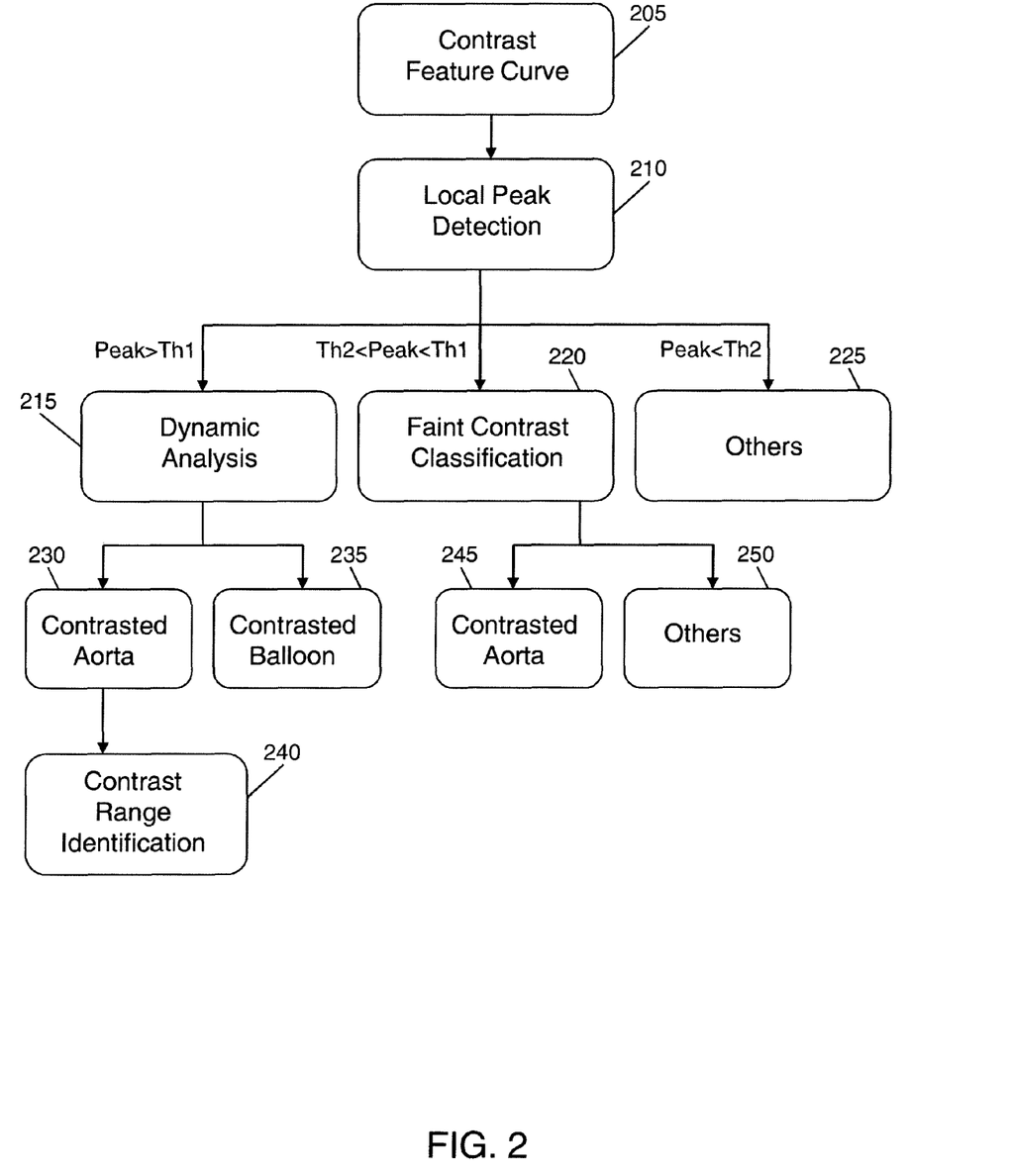
FIG. 2 is a diagram of a method for contrast detection according to an exemplary embodiment of the present invention.
Figure 3:
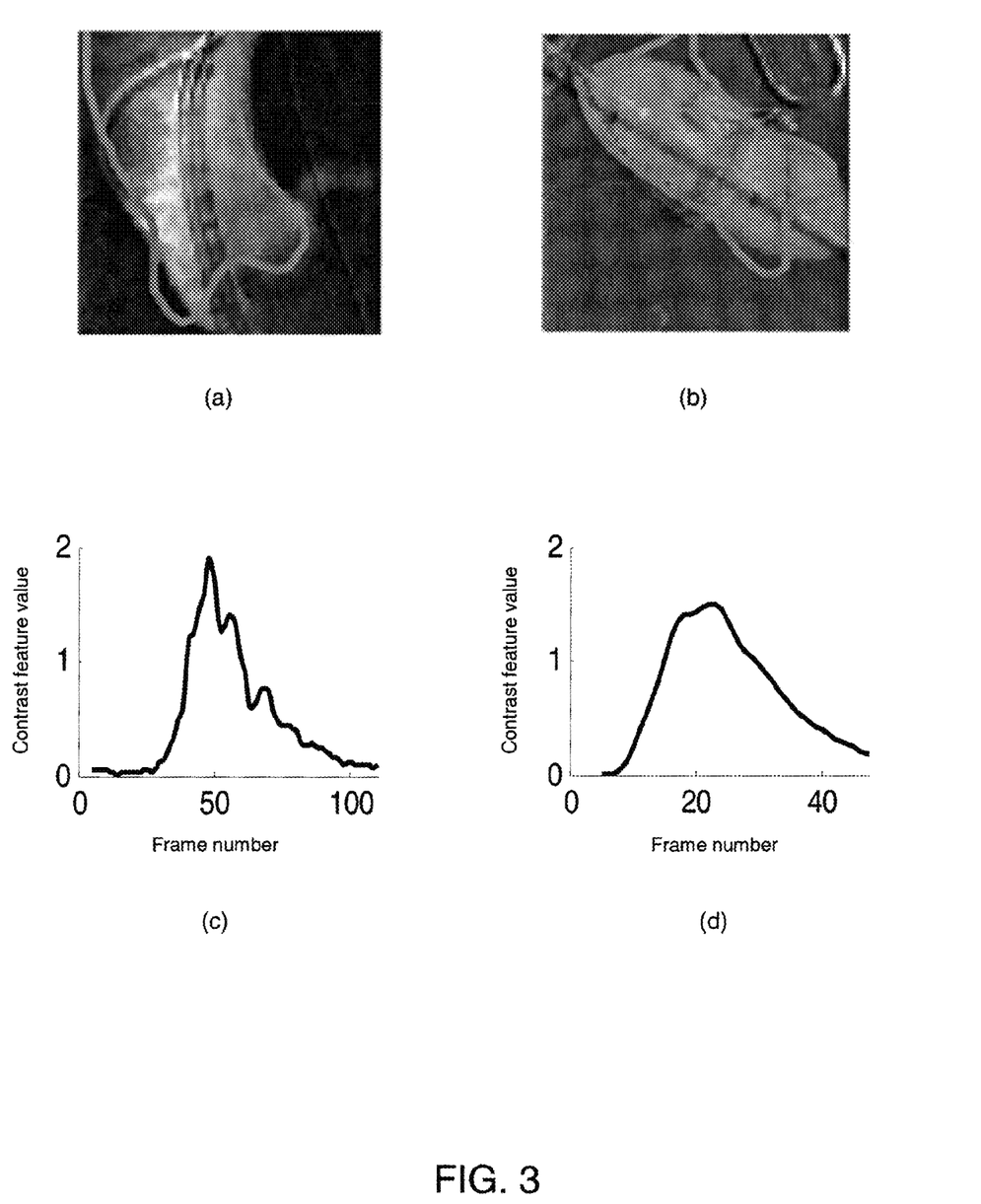
FIG. 3 illustrates an aorta aligned with a pre-defined aorta shape model SM (a), a balloon aligned with SM (b), a contrast feature curve of the aorta (c), and a contrast feature curve of the balloon (d), the shape model and contrast feature curves being computed according to an exemplary embodiment of the present invention.

As shown in FIG. 2, for a given contrast feature curve (205), a local peak of a segment may be detected based on its absolute value, pick-up gradient, and its temporal relations to other peaks (210). Note that the detected peak in theory should correspond to one contrast injection in the aortic root, but it may not be always true, since there are other factors that can result in image intensity change during surgery. For example, a balloon could be inflated and then deflated for the purpose of valvuloplasty and/or expanding the prosthetic valve, producing a similar contrast feature curve as that for contrast flowing in and then washing out in the aorta, as shown in FIG. 3c and FIG. 3d. In addition, a faint contrast tends to produce a peak with a smaller absolute value, which can be mistaken as changes coming from table movement, large cardiac motion, and/or insertion of devices. These issues are handled by the method according to an exemplary embodiment of the present invention as shown in FIG. 2.

For example, for a detected peak with a high value (e.g., greater than a first threshold Th1, 215), classification between contrasted aorta (230) versus contrasted balloons (235) is performed, and if the peak is classified as a contrasted aorta, the range of contrasted frames is further determined (240). For a detected peak with a medium value (e.g., between the first threshold Th1 and a second threshold Th2, 220), classification of contrasted aorta (245) versus other possibilities (250) such as table movement is performed. Sequences without a significant peak (e.g., a detected peak less than the second threshold Th2, 225) are classified to be non-contrasted.

The thresholds may be selected heuristically based on training sequences, which is relatively straightforward due to the fact that there is normalization in the calculation of the proposed contrast feature value. In other words, they are relatively invariant across different patients/imaging protocols.

The processes of distinguishing contrasted balloons from the aorta, identifying the range of contrasted frames and classifying faint contrast will now be described in detail.

Distinguish contrasted balloons from the aorta. Since spatially a balloon expands from the middle toward the outside while the contrast in the aorta flows from the aortic root to the ascending aorta, spatio-temporal features are used to differentiate between the balloon and the aorta. Given a contrast feature curve for a sequence, the time interval [Tstart,Tstop] where the contrast is likely to be present is determined in the neighborhood of the detected peak. For a given pixel, its intensity curve over time is fitted by a seven order polynomial and its time-to-peak falling within [Tstart,Tstop] is determined. The spatio-temporal feature map $M_{ST}$ is the time-to-peak for all the pixels whose peak value is above a certain threshold, and the threshold is chosen to be lower for the pixels within the shape model SM and higher for those outside SM. If no peak is detected for a given pixel, its corresponding value in $M_{ST}$ is set to a maximum value, e.g., the duration of the sequence. It can be seen from FIG. 4 that the spatio-temporal pattern for a balloon is very different from that of an aorta. In addition, segmentation of the object with significant change, i.e., the aorta or the balloon, can be straightforwardly achieved on $M_{ST}$ by a simple thresholding procedure.

Figure 5:
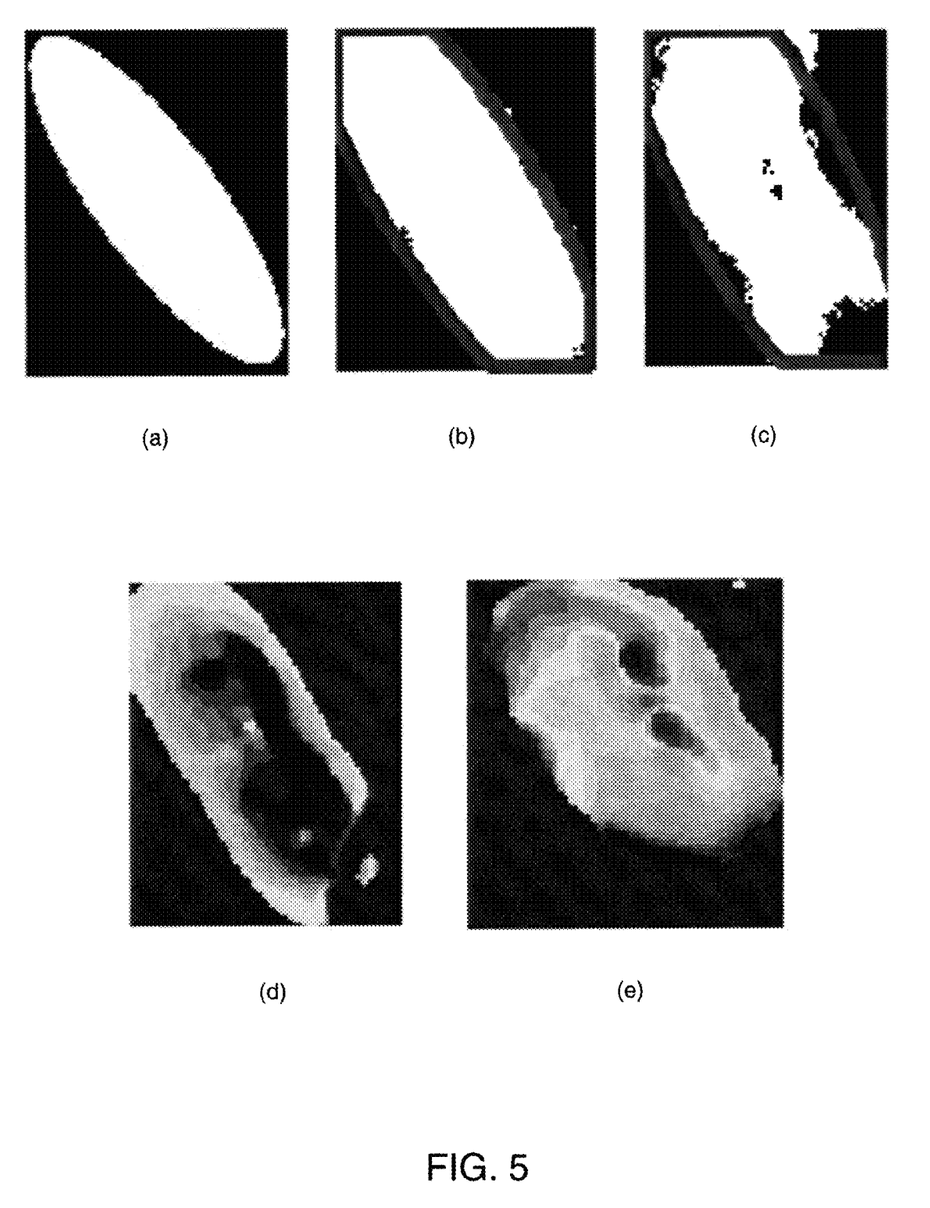
FIG. 5 shows a binary image of a generic balloon model (a), the balloon model fitted to a balloon case (b), the balloon model fitted to an aorta case (c), the classification of a balloon with a low shape score (d) and the classification of a balloon with its expansion starting from the bottom (e), the classifications being computed according to an exemplary embodiment of the present invention.

The method employs a cascaded classifier that combines the spatio-temporal feature and the segmentation property of $M_{ST}$ to detect a balloon. At the first layer, $M_{ST}$ is used as the feature vector with a simple linear support vector machine (SVM), and a balloon is detected for a positive response. An exemplary SVM is described in C. C. Chang and C. J. Lim, "LIBSVM: a Library for Support Vector Machines," 2001, the disclosure of which is incorporated by reference herein in its entirety. For a negative response, $M_{ST}$ is then binarized to $BW_{WST}$ and fitted with a generic balloon model $BW_{balloon}$ at the second layer using the method presented in A. Tsai et al., "A Shape-Based Approach to the Segmentation of Medical Imagery Using Level Sets," IEEE Trans. On Medical Imaging, 22(2): 137-54, 2004, the disclosure of which is incorporated by reference herein in its entirety. FIG. 5 shows a binary image of a generic balloon model (a), the balloon model fitted to a balloon case (b), and fitted to an aorta case (c). FIG. 5(d) shows a balloon case with a low shape score due to its occlusion at the bottom by a transesophageal echocardiography (TEE) probe, while its perfusion pattern can be picked up by the cascaded classifier nicely at the first layer. FIG. 5(e) shows a balloon case with an irregular expansion pattern starting from the bottom, while its shape score is relatively high and can be recognized by the cascaded classifier at the second layer. A shape similarity score is calculated as the ratio of the numbers of pixels inside and outside the fitted balloon, and a balloon is detected when the score is larger than a high threshold.

$$Score_{shape} = (BW_{MST} \subset BW_{balloon})/(BW_{MST} \not\subset BW_{balloon}) \quad [1]$$

Figure 6:
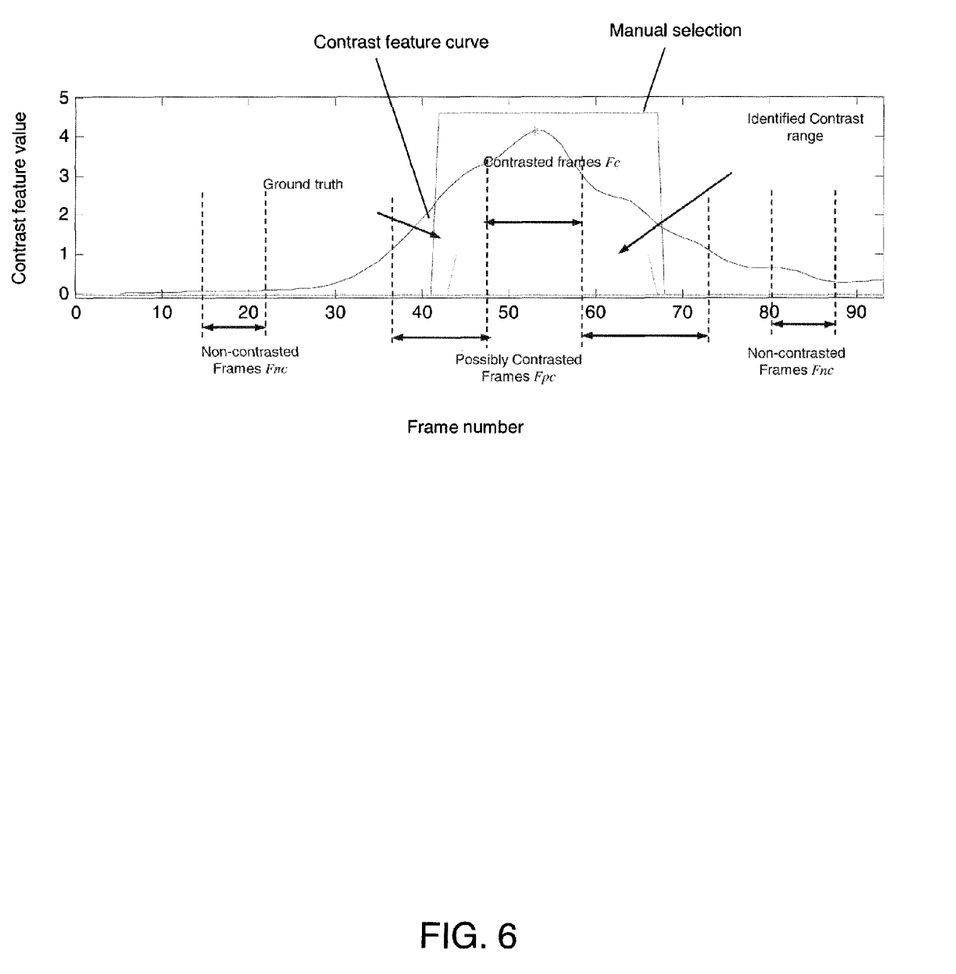
FIG. 6 illustrates training and testing samples for contrast range detection, according to an exemplary embodiment of the present invention.

Identify the Range of Contrasted Features. For a sequence confirmed to have contrast injection in the aortic root with a detected peak, P, the temporal information provided by the contrast feature curve is used, and the frames in the sequence are grouped into three categories: contrasted frames Fc, non-contrasted frames Fnc, and possibly contrast frames Fpc, as shown in FIG. 6. The range for Fc is determined by propagating the frame counter from P to both sides on the curve. The propagation stops when the feature value falls below 80% of the peak value and is smaller than 3.0, or the maximum allowable number of frames is reached on each side. The maximum possible number of contrasted frames is estimated according to the frame rate and the typical contrast injection protocol for TAVI. Starting from the outmost frames in Fc on both sides, the range of Fpc is determined by propagating until the contrast feature value falls below 30% of the peak value or 0.7 in the absolute value. Fnc contains the same number of frames as Fc, and its innermost frames are identified by continuing to propagate from the outmost frames in Fpc until the feature value falls below 10% of the peak value or 0.6, and is a certain number of frames away after P, as the contrast agent tends to persist after the peak. Again, since the contrast feature value is nicely normalized, simple hard thresholds given above work robustly for a variety of sequences.

Figure 8:
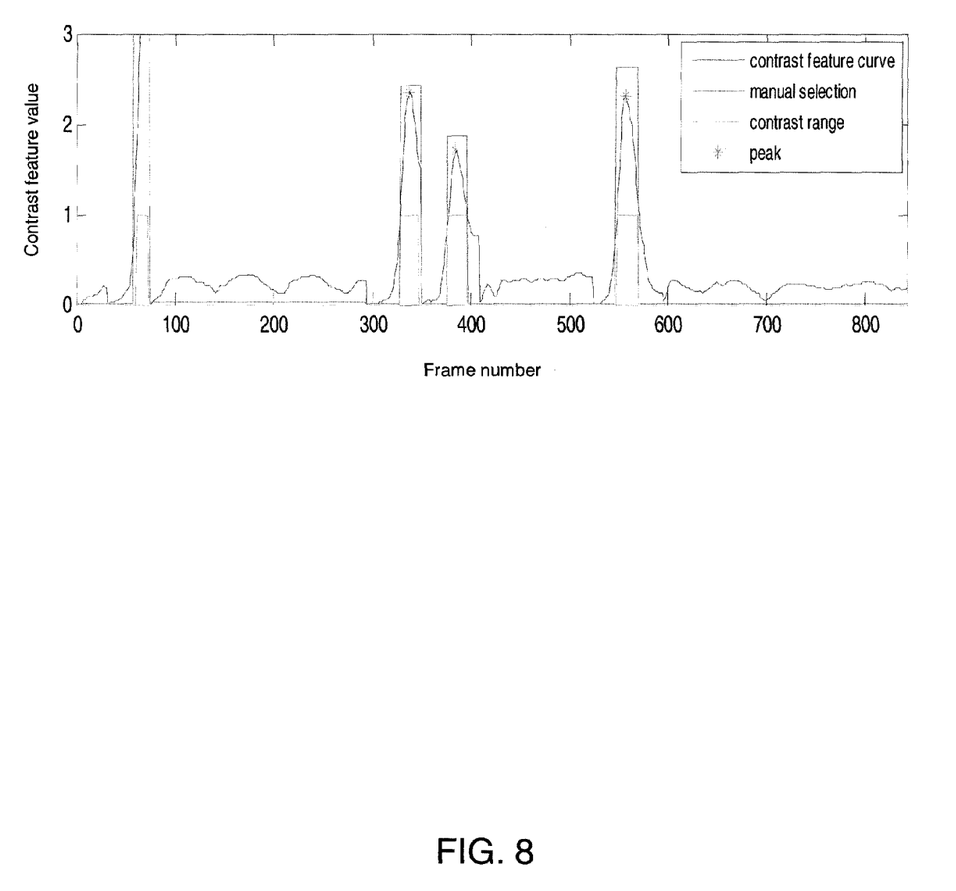
FIG. 8 illustrates contrast range identification for multiple sequences of a patient, according to an exemplary embodiment of the present invention.

Morphological opening and closing operations are applied to remove ghost effects caused by cardiac and/or respiratory motion, and a median filter is further used to smooth the image. A Sobel edge filter is applied to generate the edge map. All the frames in Fc and Fnc are used to train the simple linear SVM classifier with the edge map as the feature vector. Frames from Fpc are then classified using this locally trained classifier to get a binary class label for each frame. The outmost contrasted frames on each side of P are identified as the first frame when the majority of its neighboring frames within a certain window (e.g., 5 frames) are labeled as non-contrasted by the classifier. Results of contrast range detection for several sequences are shown in FIG. 8. Compared to a globally trained classifier, e.g., a classifier trained with frames from different sequences, the locally trained classifier fully explores the high temporal correlation among the frames by focusing only on the variations caused by contrast injection for this given sequence, and this is not biased by those large variations coming from other sources such as different patients/acquisitions/protocols, etc. Hence, it tends to produce much more accurate and robust results than a globally trained classifier, even with simple features such as the edge map and a simple linear SVM classifier.

Figure 9:
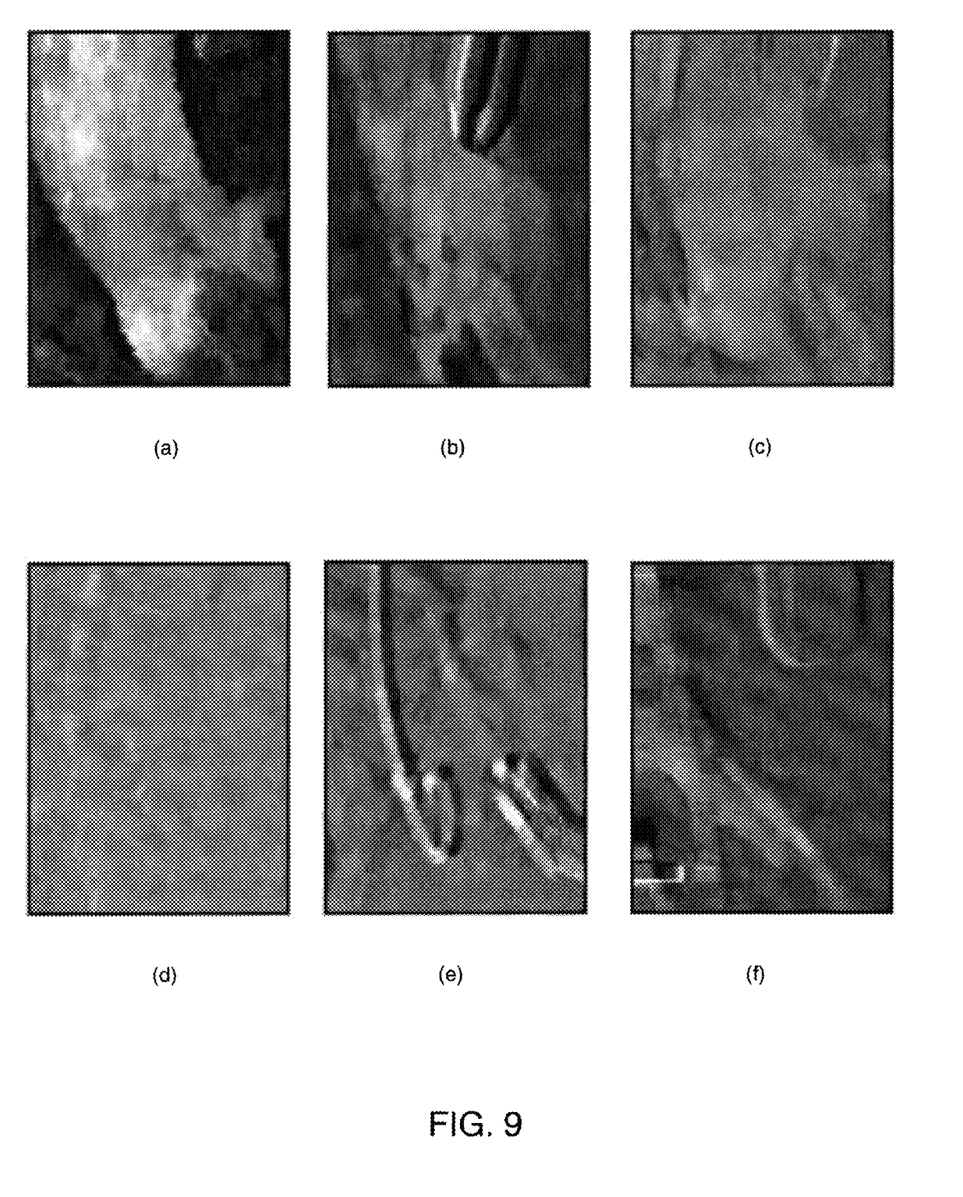
FIG. 9 illustrates well-contrasted aorta (a), faint-contrasted aorta (b-c), a good non-contrasted frame (d) and difficult non-contrasted frames due to device and/or table movement in subtracted images (e-f), used to train a classifier according to an exemplary embodiment of the present invention.

Classify Faint Contrast. When the detected peak is of medium value, it could be due to faint contrast, as shown in FIG. 9(b-c), or large movement of peripheral structures and/or devices, and slow table movement, as shown in FIG. 9(d-f). To handle these cases robustly, a global classifier is trained using examples from different patients and sequences, and a more advanced feature selection procedure is performed using the method presented in J. Mutch et al., "Object Class Recognition and Localization Using Sparse Features with Limited Receptive Fields," Int. J. Comput. Vis., 80:45-57, 2008, the disclosure of which is incorporated by reference herein in its entirety. In particular, a set of sparse and localized features in a biologically-inspired model disclosed in J. Mutch et al., "Object Class Recognition and Localization Using Sparse Features with Limited Receptive Fields," Int. J. Comput. Vis., 80:45-57, 2008 is extracted, and is then used by a linear SVM classifier for classification. Again, the temporal information provided by the contrast feature curve is utilized by selecting a number of frames in the neighborhood of the detected peak P and then feeding them into this globally trained classifier. The sequence is classified as contrasted if at least one of the selected frames is classified as contrasted. Identification of the range of the contrasted frames in this case is not performed due to the observation that for a faint contrast injection, typically at most a couple of frames contain reasonably good contrast that may potentially be useful for registration purpose.

Test results of the method for contrast detection according to an exemplary embodiment of the present invention will now be discussed.

Figure 7:
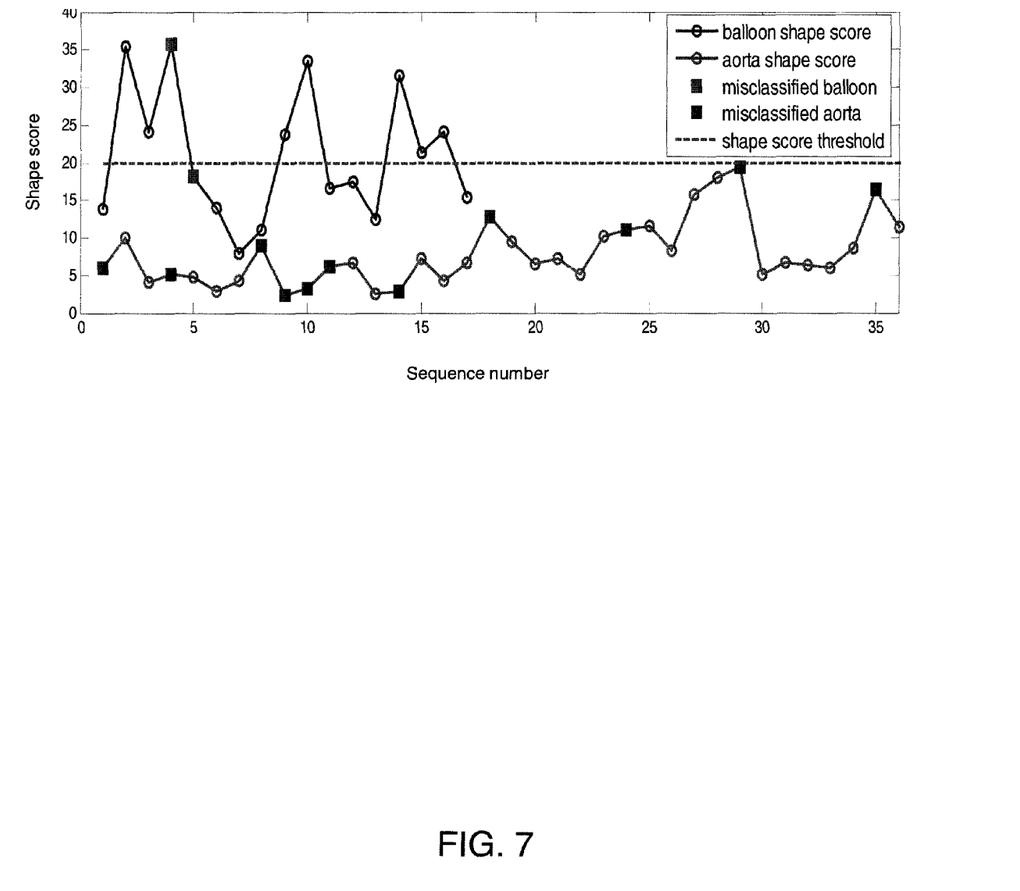
FIG. 7 illustrates results of differentiating a balloon from an aorta, according to an exemplary embodiment of the present invention.

Distinguish contrasted balloons from aorta. The cascaded classifier was used to analyze 36 sequences with a well-contrasted aorta, and 17 sequences with a contrasted balloon, all of which had a detected peak with a value higher than 1.0. In each test case, 16 samples randomly selected from the 36 samples of well-contrasted aorta and 16 samples of balloons were used for training on the spatio-temporal feature map $M_{ST}$, and the remaining samples were used for testing. There were therefore 17×(36-16) test cases for the aorta, and 17 cases for the balloon. At the first layer, the detection rate was 90.1% for the aorta and 90.6% for the balloons. In comparison, when using the raw fluoroscopic image, the detection rate was only 75% for the aorta and 78% for the balloons. At the second layer, all examples classified (including misclassified) as aorta at the first layer were fitted with the generic balloon shape model, and those with the score defined in equation 1 higher than 20 were still classified as a balloon. FIG. 7 shows the shape scores of the aorta and balloon, together with the examples misclassified at the first layer. It can be seen that the shape score alone cannot separate the balloon and the aorta accurately. However, the classifier using the spatio-temporal feature map picks up the perfusion pattern very nicely and can classify those balloons with a lower shape score (e.g., due to partial occlusion, as shown in FIG. 5(d)) reliably. The two balloon cases mis-classified at the first layer are due to irregular balloon expanding from the bottom instead of the middle, as shown in FIG. 5(e). When the shape score is used at the second layer with a relatively high threshold, the aorta samples potentially mis-classified at the first layer can be reliably excluded. Hence, using the cascaded classifier, a very high classification rate can be obtained with a very limited number of training data (since only one spatio-temporal map is available for one sequence), with 36/36 aorta and 16/17 balloons correctly classified in all the test cases.

Identify the range of contrasted frames. Contrast range identification is performed on 36 sequences with a well-contrasted aorta. There were in total 1624 frames spanning from the very beginning of the injection of the contrast to the complete wash-out of the contrast agent. 904 frames were manually selected as with contrast in the aortic root and ascending aorta and being good for registration purposes. 768 frames (85% of the 904 contrasted frames) were correctly identified by the method of the present invention. A total of 136 frames within the manual selection were missed by the method of the present invention, and a total of 222 frames outside the manually selected range were identified as having a good contrast. This was a very reasonable result because the manual selection of the border of the contrast range was relatively subjective due to the very high correlation among the neighboring frames.

Classify faint contrast. The classifier for faint contrast detection was trained using the positive samples from a mixture of well-contrasted aorta and relatively faint ones, as shown in FIGS. 9a-c. Among 69 sequences, there were four sequences with a faint contrast and four non-contrasted sequences whose contrast feature peak value fell within the range of 0.4-1.0. For each test sequence, 100 positive and 100 negative training samples were randomly selected, excluding the samples from the test sequence. 20 features were extracted according to the method in J. Mutch et al., "Object Class Recognition and Localization Using Sparse Features with Limited Receptive Fields," Int. J. Comput. Vis., 80:45-57, 2008 and used for classification. For a test sequence, frames with a contrast feature value higher than 80 percent of the peak value of the sequence were classified using the classifier. The results are summarized in Table 1. The classifier was able to correctly classify at least one sample for each sequence with a faint contrast, even for the one that is further interfered with table movement, resulting in a mis-match of the region of interest (C.4). In addition, for non-contrasted sequences, the classifier is robust to the complications from cardiac motion, table movement, and insertion of devices.

TABLE 1

Classification of faint contrasted sequences and difficult non-contrasted sequences. Correctness rate is the ratio of correctly classified frames and the total number of frames.

| Faint contrast | C.1 | C.2 | C.3 | C.4 |
|---|---|---|---|---|
| Correctness rate | 7/11 | 11/13 | 8/10 | 1/10 |
| Non-contrast with a detected peak | N.1 | N.2 | N.3-1 | N.3-2 |
| Correctness rate | 15/15 | 17/17 | 18/18 | 23/23 |

Figure 10:
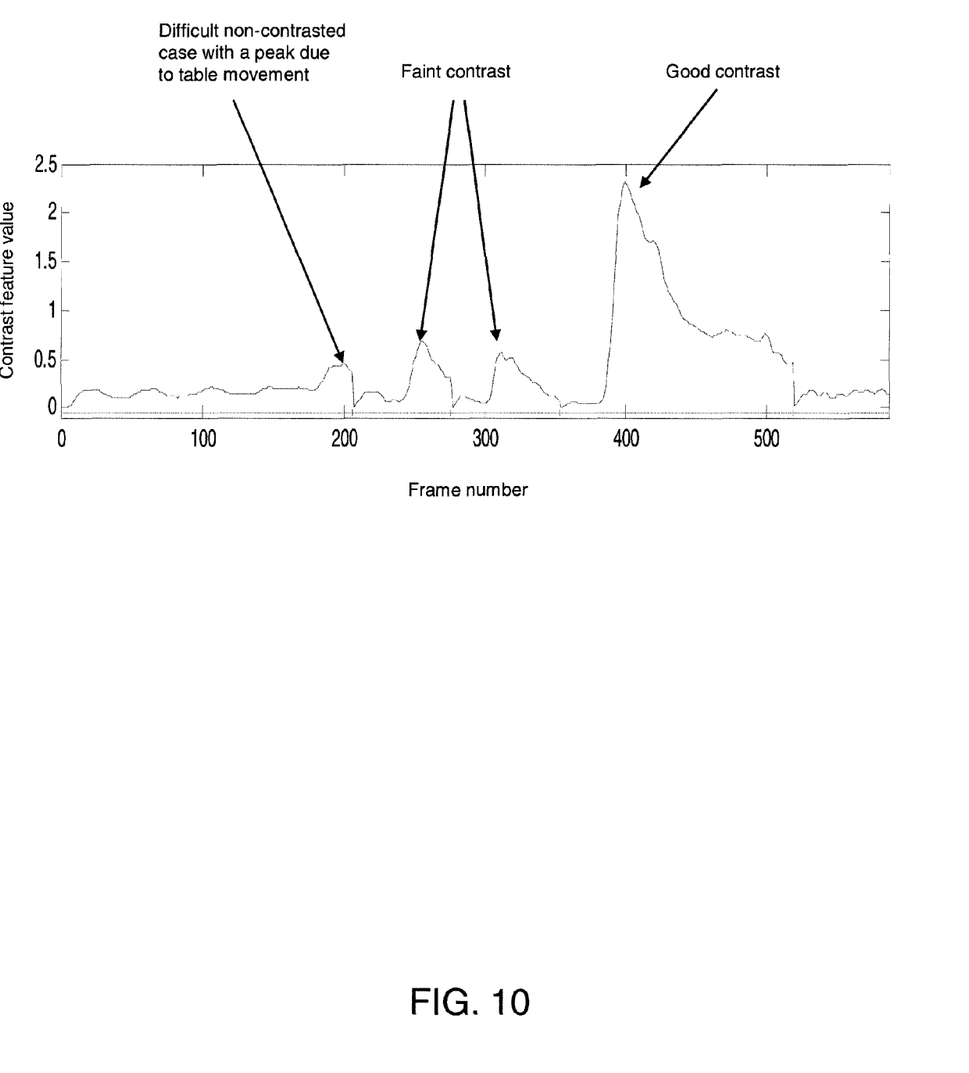
FIG. 10 is a contrast feature curve for multiple sequences, according to an exemplary embodiment of the present invention.

FIG. 10 shows a few examples of the contrast feature curve corresponding to a no contrast sequence with a local peak due to table movement, two faint contrast sequences each with a small peak value, and a good contrast sequence with a high peak value.

As will be appreciated by one skilled in the art, aspects of the present invention may be embodied as a system, method or computer program product. Accordingly, aspects of the present invention may take the faun of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
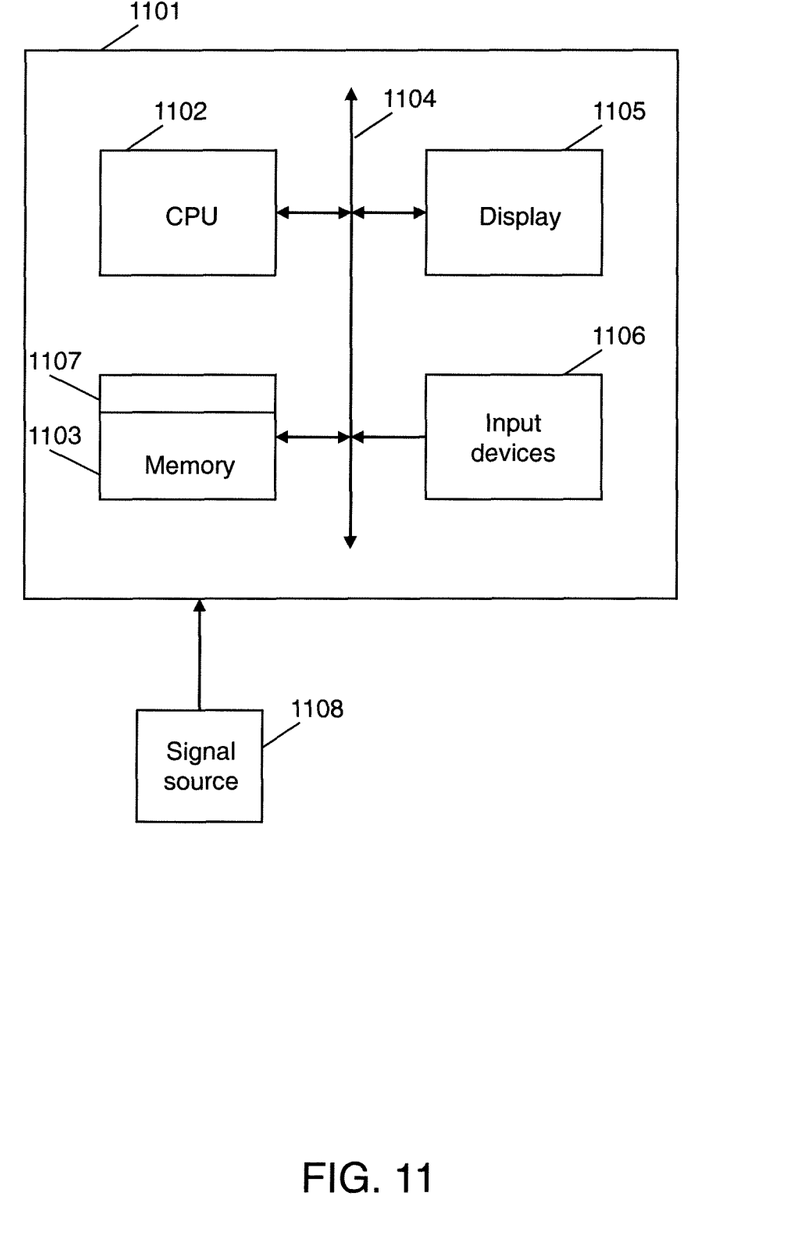
FIG. 11 illustrates a system in which an exemplary embodiment of the present invention may be implemented.

Referring now to FIG. 11, according to an exemplary embodiment of the present invention, a computer system 1101 can comprise, inter alia, a central processing unit (CPU) 1102, a memory 1103 and an input/output (I/O) interface 1104. The computer system 1101 is generally coupled through the I/O interface 1104 to a display 1105 and various input devices 1106 such as a mouse and keyboard. The support circuits can include circuits such as cache, power supplies, clock circuits, and a communications bus. The memory 1103 can include RAM, ROM, disk drive, tape drive, etc., or a combination thereof. Exemplary embodiments of present invention may be implemented as a routine 1107 stored in memory 1103 (e.g., a non-transitory computer-readable storage medium) and executed by the CPU 1102 to process the signal from a signal source 1108. As such, the computer system 1101 is a general-purpose computer system that becomes a specific purpose computer system when executing the routine 1107 of the present invention.

The computer system 1101 also includes an operating system and micro-instruction code. The various processes and functions described herein may either be part of the micro-instruction code or part of the application program (or a combination thereof) which is executed via the operating system. In addition, various other peripheral devices may be connected to the computer system 1101 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method, comprising:
    generating a contrast feature curve for a medical image sequence comprising a plurality of frames, wherein the contrast feature curve represents contrast feature values of the frames;
    detecting a peak in the contrast feature curve; and
    determining whether the peak corresponds to at least one of contrast injection in an aortic root, contrast injection in a balloon, and a non-contrast injected region;
    wherein when the contrast feature values of the peak are less than a first threshold and greater than a second threshold, the method further comprises:
    extracting features from the medical image sequence and feeding the features into a support vector machine (SVM) to train the SVM; and
    classifying frames in the neighborhood of the peak as being of the contrast injected aorta or not having contrast injection based on the number of neighboring frames classified as contrasted using the SVM.

2. The method of claim 1, wherein the medical image sequence is fluoroscopic or angiographic.

3. The method of claim 1, wherein a contrast feature value of a frame is a ratio of histogram similarity at that frame to a first reference histogram representing the aortic root with contrast injection and a second reference histogram representing the aortic root without contrast injection.

4. The method of claim 1, wherein when the contrast feature values of the peak are greater than a first threshold, the method further comprises:
    generating a spatio-temporal feature map which identifies an arrival time of contrast injection at each pixel;
    identifying, in the spatio-temporal feature map, a distribution pattern of the time-of-arrival; and
    determining that the spatio-temporal feature map is of the aortic root if the time-of-arrival is smallest near a lower edge of the spatio-temporal feature map and increases upward, or that the spatio-temporal feature map is of the balloon if the time-of-arrival is smallest near a center of the spatio-temporal feature map and increases outward.

5. The method of claim 4, wherein a shape similarity score is calculated using shape matching to a segmentation of the spatio-temporal feature map to further determine that the medical image sequence is of the aortic root or the balloon.

6. The method of claim 4, wherein a cascaded classifier is used to combine the distribution pattern of the time-of-arrival and a shape-similarity score to detect a balloon.

7. The method of claim 4, further comprising:
    determining which frames neighboring the frames of the peak have contrast injection, wherein this determination is performed using a classifier trained using the frames of the peak known to have contrast injection and frames not neighboring the peak known not to have contrast injection.

8. The method of claim 1, wherein when the contrast feature values of the peak are less than a second threshold the peak corresponds to the non-contrast injected region.

9. A system, comprising:
    a memory device for storing a program;
    a processor in communication with the memory device, the processor operative with the program stored on a non-transitory computer readable medium to:
    generate a contrast feature curve for a medical image sequence comprising a plurality of frames, wherein the contrast feature curve represents contrast feature values of the frames;
    detect a peak in the contrast feature curve; and
    determine whether the peak corresponds to at least one of contrast injection in an aortic root, contrast injection in a balloon, and a non-contrast injected region;
    wherein when the contrast feature values of the peak are less than a first threshold and greater than a second threshold, the processor is operative with the program to:
    extract features from the medical image sequence and feed the features into a support vector machine (SVM) to train the SVM; and classify frames in the neighborhood of the peak as being of the contrast injected aorta or not having contrast injection based on the number of neighboring frames classified as contrasted using the SVM.

10. The system of claim 9, wherein the medical image sequence is fluoroscopic or angiographic.

11. The system of claim 9, wherein a contrast feature value of a frame is a ratio of histogram similarity at that frame to a first reference histogram representing the aortic root with contrast injection and a second reference histogram representing the aortic root without contrast injection.

12. The system of claim 9, wherein when the contrast feature values of the peak are greater than a first threshold, the processor is operative with the program to:
generate a spatio-temporal feature map which identifies an arrival time of contrast injection at each pixel;
identify, in the spatio-temporal feature map, a distribution pattern of the time-of-arrival; and
determine that the spatio-temporal feature map is of the aortic root if the time-of-arrival is smallest near a lower edge of the spatio-temporal feature map and increases upward, or that the spatio-temporal feature map is of the balloon if the time-of-arrival is smallest near a center of the spatio-temporal feature map and increases outward.

13. The system of claim 12, wherein a shape similarity score is calculated using shape matching to a segmentation of the spatio-temporal feature map to further determine that the sequence is of the aortic root or the balloon.

14. The system of claim 12, wherein a cascaded classifier is used to combine the distribution pattern of the time-of-arrival and a shape-similarity score to detect a balloon.

15. The system of claim 12, wherein the processor is operative with the program to:
determine which frames neighboring the frames of the peak have contrast injection, wherein this determination is performed using a classifier trained using the frames of the peak known to have contrast injection and frames not neighboring the peak known not to have contrast injection.

16. The system of claim 9, wherein when the contrast feature values of the peak are less than a second threshold the peak corresponds to the non-contrast injected region.

17. A computer program product, comprising:
a non-transitory computer readable storage medium having computer readable program code embodied therewith, the computer readable program code comprising:
computer readable program code configured to perform the steps of:
generating a contrast feature curve for a medical image sequence comprising a
plurality of frames, wherein the contrast feature curve represents contrast feature values of the frames;
detecting a peak in the contrast feature curve; and
determining whether the peak corresponds to at least one of contrast injection in an aortic root, contrast injection in a balloon, and a non-contrast injected region;
wherein when the contrast feature values of the peak are less than a first threshold and greater than a second threshold, the processor is operative with the program to:
extract features from the medical image sequence and feed the features into a support vector machine (SVM) to train the SVM; and
classify frames in the neighborhood of the peak as being of the contrast injected aorta or not having contrast injection based on the number of neighboring frames classified as contrasted using the SVM.

* * * * *